UNITED STATES PATENT OFFICE.

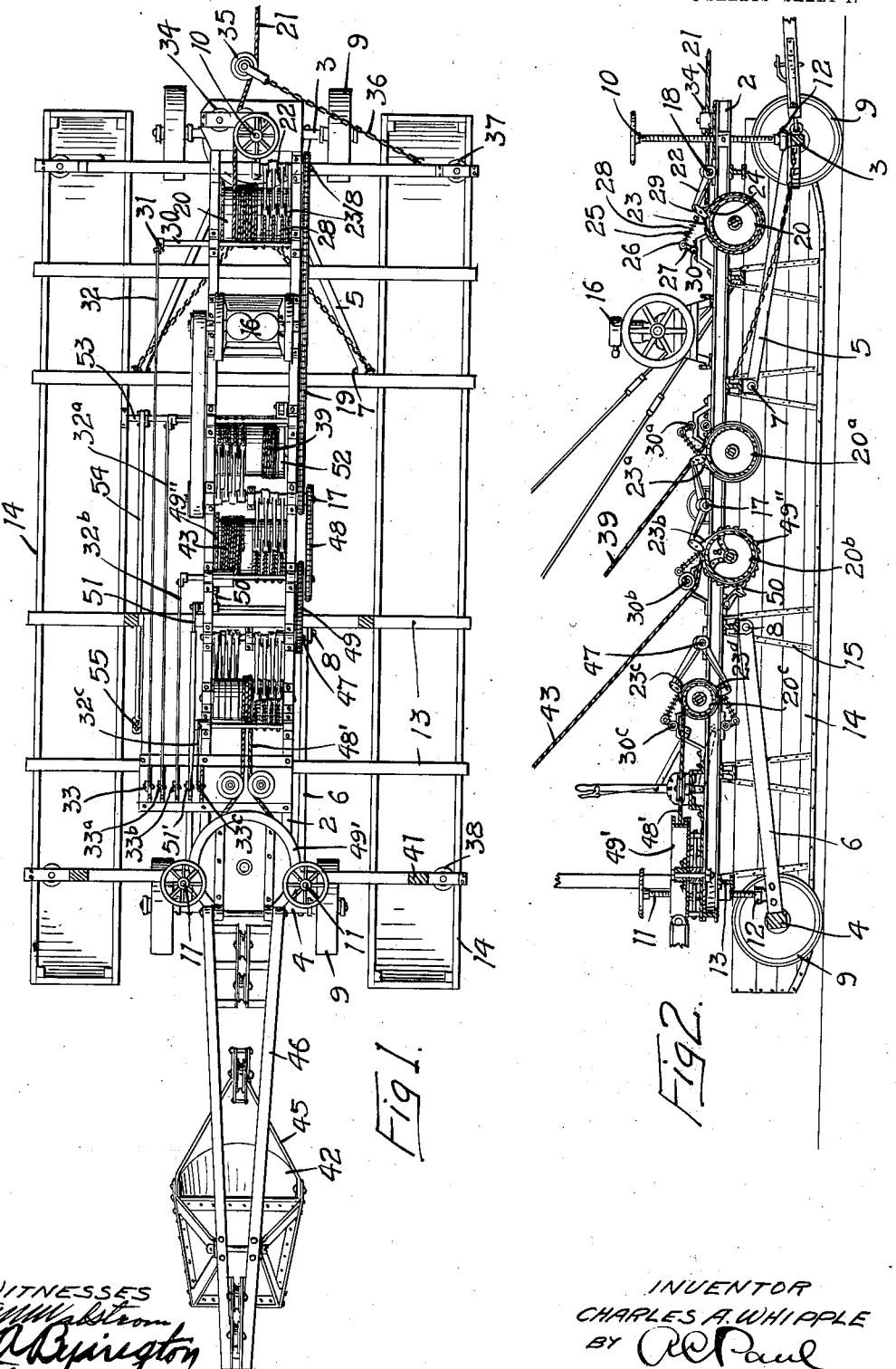

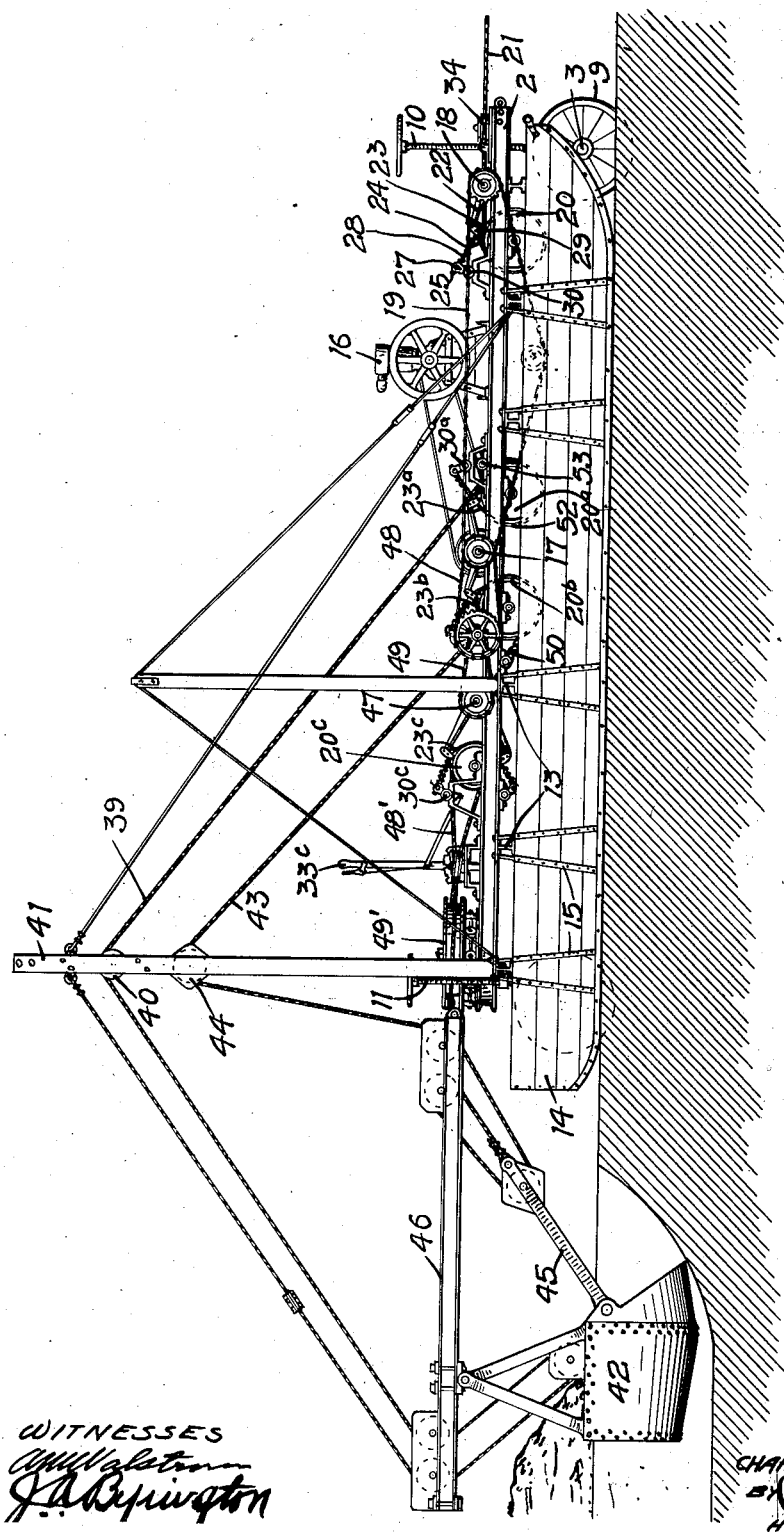

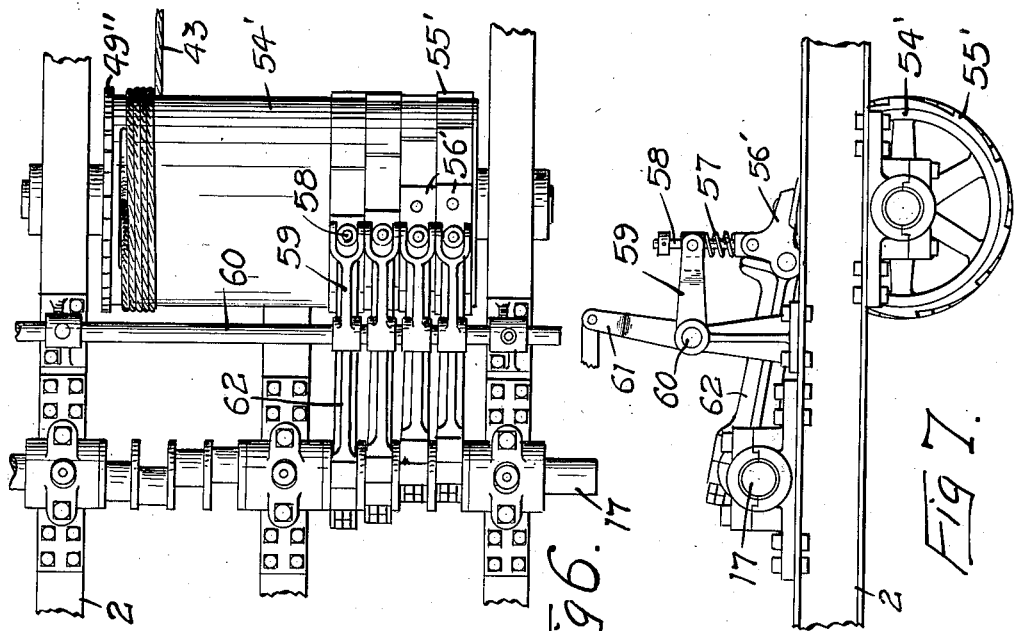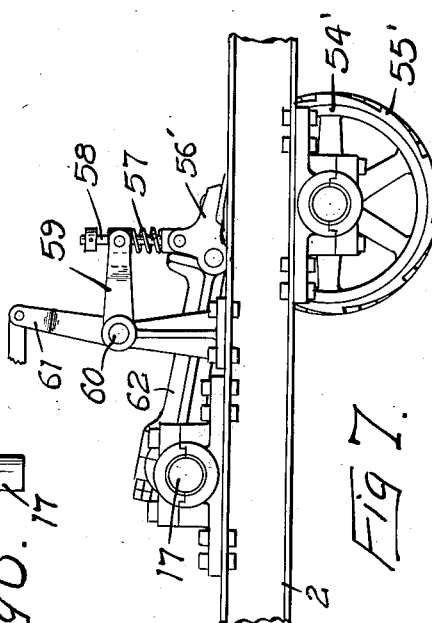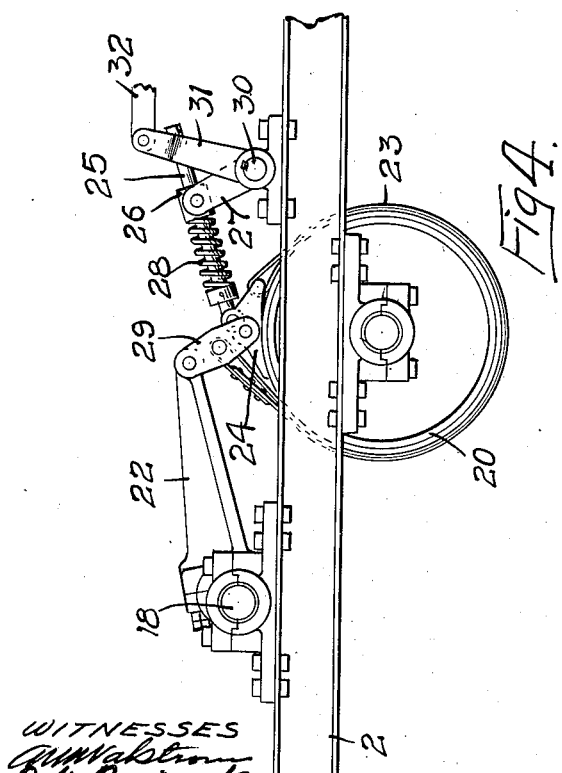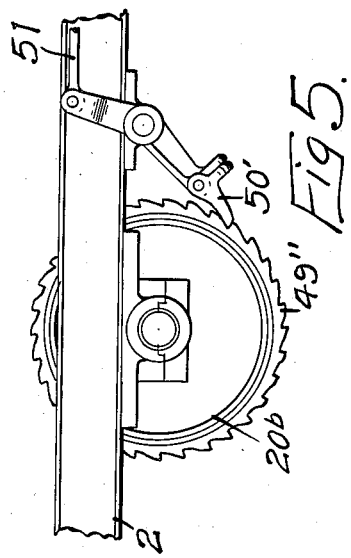

CHARLES A. WHIPPLE, OF ELK RIVER, MINNESOTA, ASSIGNOR TO THE GOPHER MANUFACTURING COMPANY, A CORPORATION OF SOUTH DAKOTA.

EXCAVATING-MACHINE.

1,015,525.

Specification of Letters Patent.    Patented Jan. 23, 1912.

Application filed January 18, 1909. Serial No. 472,882.

*To all whom it may concern:*

Be it known that I, CHARLES A. WHIPPLE, of Elk River, Sherburne county, Minnesota, have invented certain new and useful Improvements in Excavating-Machines, of which the following is a specification.

The object of my invention is to provide an excavating machine, designed particularly for work in swampy or wet lands where it would be impossible to use a machine on wheels.

A further object is to provide a machine of very much lighter weight than machines of this type as ordinarily constructed and hence easier to operate and to move from place to place.

A further object is to provide an excavating machine that is capable of movement forward or backward or to one side of the line of movement, while operating in marshy soil.

A further object is to provide a machine that is equipped with means to adapt it for use on dry as well as wet land.

My invention consists generally in various constructions and combinations all as hereinafter described and particularly pointed out in the claims.

In the accompanying drawings, forming part of this specification, Figure 1 is a plan view of an excavating machine embodying my invention, Fig. 2 is a longitudinal, sectional view of the same, Fig. 3 is a side elevation, Fig. 4 is a detail of one of the hoisting drums and clamping shoes therefor, Fig. 5 is a similar view, showing the means for locking the drum, Fig. 6 is a plan view, illustrating a modified construction of the clamping mechanism, Fig. 7 is an end view of the same.

In the drawing, 2 represents a frame of suitable material, preferably of steel I-beams, and 3 and 4 are forward and rear axles attached respectively to bars 5 and 6, which are pivoted at 7 and 8 on the machine frame to allow a vertical movement of the axles on the carrying wheels 9. Posts 10 and 11 are mounted in the machine frame and have ball and socket connections 12 with the axles and by revolving these posts, the operator on the machine may raise and lower the axles and carrying wheels.

Beneath the frame 2, I provide a series of transverse I-beams 13, which extend beyond the machine frame on each side and beneath the ends of these beams, I arrange scows 14, secured to the beams by straps 15 and extending the full length of the machine on each side thereof. These scows are comparatively narrow and have flat bottoms upwardly curved at each end, as indicated in Fig. 3, to facilitate the movement of the machine forward or backward when it is resting upon the scows. In moving the machine over solid ground, the operator will lower the axles and the carrying wheels until the scows are out of contact with the ground. When however, the machine is excavating in swampy soil, the carrying wheels will be raised and the weight of the machine entirely supported by the scows and the carrying capacity of these scows will of course be determined by suitable computation, according to the size and weight of the machine, it being merely necessary to increase the width of the scows to enable them to support a greater load.

At the forward end of the machine, I arrange an engine 16 belted to a double crank shaft 17 that is mounted on the machine frame near the middle thereof. A second crank shaft 18 is provided at the forward end of the frame, driven by a chain belt 19 from the crank shaft 17 and a drum 20 is provided near the shaft 18 and has a cable 21 wound thereon. A series of arms 22 are mounted on the crank shaft 18 and a series of clamping straps 23 are provided on the drum 20 having shoes 24 at one end that are adapted to contact with the surface of the drum. Pins 25 are pivotally connected with said shoes and arranged to slide in guides 26 on the arms 27 against the tension of the springs 28. The other ends of the clamps are pivotally connected to links 29 that are attached at one end to the shoes and at the other end to the arms 22. The arms 27 are mounted on a rock shaft 30 having a crank 31 connected by a rod 32 with an operating lever 33. When this lever is operated in one direction, the shaft will be rocked against the tension of the spring 25 and the shoe will be forced into engagement with the drum. The movement of the crank shaft 18 will then have the effect of rotating the drum a limited distance and the off-sets in the crank shaft are arranged so that the clamping shoes will be operated successively to engage the drum—that is, one shoe will move into contact with the drum just as another shoe is about to release it and this movement will continue throughout the whole series of clamps until the last one is reached and when that has clamped the drum and performed its function, the first clamp of the series will be in position to again engage the rotating drum. The cable that is wound on the drum 20 passes between anti-friction wheels 34 on the machine frame and contacts with a pulley 35 that is connected by a chain 36 to the end of one of the I-beams 13. The cable extends forward to an anchor post (not shown) driven into the ground a suitable distance from the machine and when the engine is started and the drum 20 revolved, the cable will be wound thereon and the machine will be moved toward the anchor post. If movement in the opposite direction is desired, the cable may be brought around to the side in contact with the pulley wheels 37 and 38 and from thence to a pulley block on an anchor post and back to the machine. A sluing or lateral movement of the machine may be obtained by carrying the cable 21 out to the side of the machine around one of the pulleys 37 or 38 and from thence to the anchor post, located at a suitable distance. I am thus able to move the machine forward or backward or swing it to the side.

I provide other drums on the machine frame, corresponding to the one described and operating in substantially the same manner and I will designate these drums by the same reference numerals as the one first described with the addition of the distinguishing exponent letters.

Referring to Fig. 1, 20$^a$ and 20$^b$ represent drums arranged one upon each side of the crank shaft 17, one drum having a cable 39 leading over a pulley wheel 40 on a mast 41 to an excavating dipper 42, which forms the subject matter of a companion application herewith and which I will not describe in detail herein. The other drum 20$^b$ has a cable 43 leading over a block 44 on the mast to a bail 45 on the dipper. This cable 39 controls the vertical movement of a boom 46, whereon the dipper is supported. By operation of the drum 20$^a$, the dipper and the boom are raised or lowered in the operation of the machine. The clamps 23$^a$ and 23$^b$ on the drums control their revolution and mechanism similar to that already described with reference to the drum 20 is provided, for rendering the clamps operative or inoperative, said mechanism including shafts 30$^a$ and 30$^b$ having connections 32$^a$ and 32$^b$ with operating levers 33$^a$ and 33$^b$. By means of these levers, the operator can control the clamps, the revolution of the drums 20$^a$ and 20$^b$ and the movement of the boom and dipper.

A third crank shaft 47 is provided, driven from the shaft 17 through belts 48 and 49 to obtain the desired reduction in speed and on this crank shaft is a fourth drum, which I will designate by the reference numeral 20$^c$. This drum has a cable 48' extending to a turn-table 49' whereon the boom 46 is supported. By the oscillation of this turn-table, the boom is swung horizontally to adjust the dipper in front or on either side of the machine. Two sets of clamping bands are provided in connection with this drum, one above and the other below the drum, represented herein by 23$^c$ and 23$^d$. These clamps are controlled by a mechanism corresponding to that heretofore described and I will indicate the mechanism with the same reference numeral with the addition of the exponent "$c$". A ratchet 49'' is provided in connection with the dipper-controlling drum 20$^b$ and a dog 50 is controlled by a rod 51, which extends to a lever 51'. This dog or pawl has a pivoted toe 50' that is adapted to engage the teeth of the ratchet wheel and swing on its pivot, when power is applied to operate the pawl, to allow the disengagement of the toe from the teeth of the ratchet. I am thus able to disengage the pawl from the ratchet, even when the drum is under the strain of a load. A similar lever 33$^c$ controls the rock shaft 30$^c$ and the clamping or release of the drum 20$^c$. A brake strap 52 is provided for the drum 20$^a$ controlled by a shaft 53 having an arm 54, leading to a treadle 55. By means of this brake strap, the boom drum may be locked to support the boom in any desired position when the clamping straps for said drum are released.

By means of the foregoing described mechanism, the operator, stationed near the series of levers described, has absolute and perfect control over the boom and the dipper-operating mechanism and can also control the drum 20 and the travel of the machine. It will be understood that my purpose in using these drums and clamping straps is to obtain great power within a small compass and without employing heavy mechanical parts, and at the same time, provide a mechanism, which will be positive and reliable at all times.

In Figs. 6 and 7, I have illustrated a modified construction, which consists in providing a drum 54' with a series of ratchet teeth 55' and dogs 56 engaging these teeth each having a part 56', which will allow the disengagement of the dog from the teeth, (as described above) even when a heavy strain is applied to the drum cable. Each dog is held in an operative position by means of a spring 57 on a rod 58 movable in an arm 59, said arm being mounted on a rock shaft 60, which has an arm 61 oscillated by means of an operating lever. The crank shaft arm 62 whereon the dog 56 is pivoted, corresponds substantially to those used in connection with the clamping straps. The operation of the machine will be substantially the same when either form of drum-engaging device is used. In the operation of the machine, an anchor post is driven into the ground a suitable distance ahead and the machine drawn along by means of the drum and cable, as described, or a suitable traction apparatus, which I have not thought necessary to illustrate, may be employed. The machine is then moved along and the boom raised and lowered or swung to either side to set the dipper in its working position and allow it to dump its load. The machine will have a wide radius of movement owing to the sweep of the boom from side to side. On approaching wet or marshy ground, where an ordinary excavating machine could not be used, the wheels will be raised, allowing the scows to contact with the ground and support the machine, the movement forward or backward continuing in the same manner as when the machine rests upon the wheels.

I have found a machine of this type to be extremely efficient, capable of working in a swamp and as the operating mechanism is comparatively simple, the machine can be constructed so that it will weigh very much less than excavating machines as ordinarily built and it will not be necessary for the scows to be large or unwieldy to enable them to support the load in soft ground or shallow water. The dipper, as described in my companion application, has a filling movement toward the machine and can be easily and quickly moved to its dumping position by the operation of the drums.

I claim as my invention:—

1. In an excavating machine, the combination with a frame having carrying wheels, of scows provided one on each side of said machine, means for raising and lowering said carrying wheels to allow the scows to come in contact with the ground or to lift them out of contact with the ground.

2. In an excavating machine, the combination with a frame having forward and rear carrying wheels, and bars projecting laterally on each side of said machine, scows provided beneath said bars and attached thereto, and means for raising and lowering said carrying wheels to lift said scows out of contact with the ground or allow them to come in contact with the ground.

3. In an excavating machine, the combination with an I-beam frame having forward and rear axles and carrying wheels therefor, an I-beam extending transversely of said frame and projecting beyond the same on each side, scows provided under the ends of said I-beams and secured thereto, and means for raising and lowering said axles and carrying wheels.

4. In an excavating machine, the combination with a frame, of scows attached to said frame on each side and extending lengthwise thereof, said scows having upwardly turned ends and capable of supporting the machine in wet or marshy ground, forward and rear axles and carrying wheels provided under said frame between said scows and means for raising and lowering said axles and wheels.

5. In an excavating machine, the combination with a wheeled frame, of scows attached to said frame on each side of the machine, means for raising the carrying wheels to allow the scows to contact with the ground, a drum mounted on the forward portion of said frame, an engine having a driving connection with said drum, a cable wound on said drum, pulleys mounted on said frame in advance of said drum and between which said cable passes, and said cable being adapted to extend forward to an anchoring post, for the purpose specified.

6. In an excavating machine, the combination with a frame having carrying wheels, of scows provided on each side of said frame, means for raising said carrying wheels to allow the scows to contact with the ground, a winding drum mounted on said frame and operatively connected with a source of power, a cable for said drum, pulleys between which said cable passes, a pulley mounted on said frame at one side of said drum and around which said cable may be passed to an anchoring post, whereby said machine may be moved laterally.

7. In an excavating machine, the combination with a revolving drum and a winding cable therefor, of a crank shaft, arms mounted on said shaft, links pivotally mounted on said arms, friction straps inclosing said drum and connected at one end to the middle portion of said links, shoes attached to the other end of said straps and having a pivotal connection to the ends of said links, a rock shaft and arms thereon, pins slidable in guides on said arms and pivotally connected with said shoes, and springs mounted on said pins and put under tension by the rocking of said shaft toward said shoes, substantially as described.

8. In a machine of the class described, the combination with a frame, of a winding drum and cable therefor, a crank shaft, a series of friction straps inclosing said drum, shoes pivotally connected with one end of said straps, means operatively connecting said shoes with said crank shaft and means within the control of the operator for tilting said shoes to draw said straps around said drum.

9. In an excavating machine, the combination with a frame, of drums mounted therein, a multiple crank shaft located between said drums, clamping straps inclosing said drums, shoes pivotally connected with one end of said straps and means operatively connecting said shoes with said crank shaft, rock shafts having means controlling the tilting of said shoes and their engagement with said drum and levers controlling the movement of said rock shafts, substantially as described.

10. In a machine of the class described, the combination with a frame, of a winding drum mounted therein, a cable for said drum, a ratchet wheel secured to said drum, means for revolving said drum with a step by step movement, a pawl located near said ratchet wheel, a toe pivoted on said pawl and engaging the teeth of said ratchet wheel and capable of release therefrom when said drum is under the strain of a load, and means for tripping said ratchet.

11. In a machine of the class described, the combination with a frame, of a drum, a series of clamping straps provided on each side of said drum, a multiple crank shaft, crank arms mounted on said shaft, means operatively connecting said crank arms with said straps, each group of straps being arranged to successively clamp said drum, one set being adapted to revolve said drum in one direction and the other set in the other direction, and means within the control of the operator for controlling the engagement of said straps with said drum.

12. In a machine of the class described, the combination with a frame, a series of drums mounted on said frame, crank shafts for said drums and means for operating the same, friction clamps inclosing said drums, means operatively connecting said friction clamps with their respective crank shafts, a series of operating levers and means actuated by the movement of said levers for controlling the engagement of said friction clamps with their respective drums, substantially as described.

In witness whereof, I have hereunto set my hand this 2d day of Jan. 1909.

CHARLES A. WHIPPLE.

Witnesses:
J. A. BYINGTON,
RICHARD PAUL.